(12) United States Patent
VanBlon et al.

(10) Patent No.: US 11,063,853 B2
(45) Date of Patent: Jul. 13, 2021

(54) METHOD AND DEVICE TO TRANSFER TO A VIRTUAL BROWSER SESSION BASED ON RESPONSIVENESS

(71) Applicant: Lenovo (Singapore) Pte. Ltd., New Tech Park (SG)

(72) Inventors: Russell Speight VanBlon, Raleigh, NC (US); Arnold S. Weksler, Raleigh, NC (US); John Carl Mese, Cary, NC (US); Nathan J. Peterson, Oxford, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 258 days.

(21) Appl. No.: 15/605,088

(22) Filed: May 25, 2017

(65) Prior Publication Data

US 2018/0343179 A1 Nov. 29, 2018

(51) Int. Cl.
*H04L 12/26* (2006.01)
*H04L 29/08* (2006.01)
*H04L 29/06* (2006.01)

(52) U.S. Cl.
CPC ............ *H04L 43/08* (2013.01); *H04L 67/141* (2013.01); *H04L 67/148* (2013.01); *H04L 67/38* (2013.01); *H04L 43/10* (2013.01); *H04L 43/16* (2013.01)

(58) Field of Classification Search
CPC ........................................................ H04L 43/08
See application file for complete search history.

(56) References Cited

U.S. PATENT DOCUMENTS

| | | | |
|---|---|---|---|
| 8,577,963 B2* | 11/2013 | Trahan | H04L 67/02 709/203 |
| 9,258,335 B1* | 2/2016 | Taylor | H04L 65/1069 |
| 10,142,423 B2* | 11/2018 | Verger | H04L 67/148 |
| 10,169,065 B1* | 1/2019 | Nye | G06F 9/45558 |
| 2003/0014478 A1* | 1/2003 | Noble | G06F 9/5083 709/203 |
| 2006/0277596 A1* | 12/2006 | Calvert | H04L 63/0218 726/3 |
| 2014/0053054 A1* | 2/2014 | Shen | G06F 16/9577 715/234 |
| 2015/0120804 A1* | 4/2015 | Eschbach | H04L 67/2842 709/203 |
| 2015/0154506 A1* | 6/2015 | Jain | H04L 67/2819 706/12 |

* cited by examiner

*Primary Examiner* — Andrew C Georgandellis
(74) *Attorney, Agent, or Firm* — The Small Patent Law Group LLC; Dean D. Small (57) ABSTRACT

Methods, devices and program products are provided initiate a local browser session, at a local browser, with a resource manager. The method, devices and program products measure a responsiveness of the local browser session and determines if the responsiveness of the local browser session falls below a threshold. Based on the determining, the local browser session may be transferred from the local browser to a virtual browser on a remote device to form a virtual browser session. The remote device is located remote from the client device. At the client device, a rendered output is displayed from the virtual browser session implemented by the virtual browser.

18 Claims, 6 Drawing Sheets

METHOD AND DEVICE TO TRANSFER TO A VIRTUAL BROWSER SESSION BASED ON RESPONSIVENESS

BACKGROUND

Embodiments herein generally relate to methods and systems to transfer from local to virtual browser sessions to maintain a desired level of responsiveness when accessing network resources.

As the Internet continues to develop, access to network resources (e.g., websites, webpages) becomes more and more a part of everyday life without regard for geographic restrictions. As individuals become more mobile, difficulties arise in providing universal access to network resources at high transfer speeds. For example, individuals, who attempt to implement a browser session at some locations and/or certain times of day will experience lower than normal network bandwidth, load times and/or overall responsiveness. A responsiveness of a browser session may vary based on numerous criteria, such as the particular path over which the content is conveyed, an amount of traffic experienced on the network, an amount of traffic experienced by a particular network resource, a nature of the networking equipment supporting the particular network path and the like.

For example, when an individual travels to a remote geographic area, or a location that has no or old networking equipment, the individual will experience relatively slow downloads of network resources. As another example, even when in a large metropolitan area or utilizing modern networking equipment, slow download speeds may still be experienced when the network is experiencing high traffic and/or a particular server is experiencing high demand.

SUMMARY

In accordance with an embodiment herein, a method is provided that utilizes one or more processors to perform the following: initiating a local browser session, at a local browser, with a resource manager. The method measures a responsiveness of the local browser session and determines if the responsiveness of the local browser session falls below a threshold. Based on the determining, the local browser session may be transferred from the local browser to a virtual browser on a remote device to form a virtual browser session. The remote device is located remote from the client device. At the client device, a rendered output is displayed from the virtual browser session implemented by the virtual browser.

Alternatively, the measuring includes measuring, as the responsiveness; one or more of the load time, bandwidth, or amount of traffic and includes comparing the responsiveness to historic responsiveness in connection with one or more prior browser sessions. A baseline browser session may be implemented at the client device and recording baseline responsiveness in connection with the baseline browser session. A normal load time may be received in connection with initiating the local browser session, the normal load time being maintained in a collection of multiple normal load times recorded in connection with multiple prior browser sessions.

Optionally, at the client device, request may be generated for the virtual browser session; conveying the requests to the virtual browser; and receiving rendered outputs from the virtual browser session where the rendered outputs are formed based on the requests generated at the client device.

Optionally, first and second routes may be traced between the client device and the resource manager and the remote device and the resource manager, respectively, wherein the determining is based in part on the first and second routes.

Optionally, the virtual browser may take over control of the local browser session, and act as a proxy for the local browser; the virtual browser may utilize a session ID assigned to the local browser session in connection with the virtual browser session. The local browser session may be assigned a first session ID. The virtual browser may be directed to initiate a new browser session having a second session ID, where the new browser session substantially duplicates one or more requests associated with the local browser session to form the virtual browser session.

In accordance with an embodiment herein, a client device is provided comprising a user interface and a display, memory storing instructions, and one or more processors. The processors are configured to initiate a local browser session, at a local browser, with a resource manager. The processors are configured to measure a responsiveness of the local browser session. The processors are configured to determine that the responsiveness of the local browser session falls below a threshold. The processors are configured to transfer the local browser session to a virtual browser on a remote device to form a virtual browser session, the remote device located remote from the client device. The processors are configured to display a rendered output from the virtual browser session implemented by the virtual browser.

Optionally, the one or more processors are configured to measure, as the responsiveness, one or more of the load time, bandwidth, or amount of traffic. When executing the instructions, the one or more processors compare the responsiveness to historic responsiveness in connection with one or more prior browser sessions. When executing the instructions, the processors implement a baseline browser session at the client device and record baseline responsiveness in connection with the baseline browser session. The one or more processors are configured to receive a normal load time in connection with initiating the local browser session, the normal load time being maintained in a collection of multiple normal load times recorded in connection with multiple prior browser sessions.

Optionally, the one or more processors are configured to: generate requests for the virtual browser session; convey the requests to the virtual browser; and receive rendered outputs from the virtual browser session where the rendered outputs are formed based on the requests generated at the client device.

In accordance with an embodiment herein, a computer program product is provided comprising a non-signal computer readable storage medium comprising computer executable code for: obtaining responsiveness of a local browser session at a local browser on a client device; obtaining responsiveness of a virtual browser session at a virtual browser on a remote device, the virtual browser session corresponding to the local browser session; transferring the local browser session between the local browser and the virtual browser based on the responsiveness of the local and virtual browser sessions; and displaying, at the client device, a rendered output from one of the local or virtual browser sessions.

Optionally, the executable code is executed by the client device for implementing the local browser session, the transferring including transferring the local browser session to the virtual browser when the responsiveness of the virtual browser session exceeds the responsiveness of the local browser session. Optionally, the executable code is executed by the remote device for implementing the virtual browser session, the transferring including transferring the virtual browser session to the local browser when the responsiveness of the local browser session exceeds the responsiveness of the virtual browser session.

Optionally, the executable code of the computer program product is executed by the client device for implementing the local browser session, the transferring including transmitting a session ID for the local browser session to the virtual browser. The executable code is executed by the remote device for implementing the virtual browser session, the transferring including receiving a session ID for the local browser session from the local browser. The executable code is executed by the client device for initiating the local browser session; measuring the responsiveness of the local browser session; and determining that the responsiveness of the local browser session falls below the threshold. The computer program product is further comprised of a collection of responsiveness information for multiple prior browser sessions, the responsiveness information recorded in connection with multiple prior browser sessions.

DETAILED DESCRIPTION

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate. The operations of any methods described herein may be performed in parallel, serially or any order unless otherwise specified. One or more of the operations of the methods described herein may be omitted entirely unless otherwise specified.

Terms

The term "network responsive resource" refers to any network retrievable structure that has identity and is returned by a resource manager in response to a request. Non-limiting examples include a file or document (e.g., webpage) on the World Wide Web, a local area network, or a wide area network. The file or document may include Hypertext Markup Language (HTML) and/or scripts, graphics, etc. The document is often hyperlinked to other documents on the Web/network. A network responsive resource includes one or more content components that may remain constant or change over time. A network responsive resource can remain constant even when the content components change over time.

A network responsive resource can be dynamic. Network responsive resources may be characterized as abstract responsive resources or information responsive resources. Uniform Resource Locaters (URLs) are frequently used to identify abstract resources, such as classes, properties or other kind of concepts. URLs are also used to identify information resources.

The term "content component" refers to entities within a document, forming a network responsive resource. Content components may include images, services (e.g., "National Weather Service"), text, video, audio, scripts, a combination thereof and/or links to other resources. The content components are rendered (e.g., assembled) by a browser of a client device for viewing by the user. For example, the content components may include static, finalized content components, such as text, images, etc. that are directly rendered and displayed by the browser. The content components may also include linking components that include a link or address of other content. Content components may also represent script based components, for which one or more scripts are to be executed before a browser can render and display an executed script (e.g., graphics, text, images, video, audio and the like). Content components may also represent auto activated components that begin to play automatically when opened in a browser. In accordance with embodiments herein, script based components may be categorized as server-side scripted components or client-side scripted components.

The term "browser" refers to an application program that provides a graphical user interface to interact with a network resource manager, such as a server operated in connection with the World Wide Web, a local area network, or a wide area network. The application program is designed to display and/or present audio/video content, based on files or documents received from the network resource manager. The application program may operate on various types of electronic devices, including, but not limited to, laptop computers, desktop computers, tablet devices, smart phones and the like. Non-limiting examples of browsers include web browsers that operate as application programs that use the hypertext transfer protocol (HTTP) to make requests of Web servers throughout the Internet on behalf of the user of the web browsers. Examples of web browsers include Mosaic, Internet Explorer, Firefox, Flock, Safari, Lynx, Chrome and Opera browsers. The term browser also includes social media application programs, such as applications for Facebook, Instagram, Twitter, YouTube, newspapers, etc.

The terms "rendering" and "render" refer to certain operations performed by a browser when processing a network responsive resource (e.g., webpage) for display. The process for rendering a network responsive resource is performed after scripted components are executed to form corresponding executed script end products. One non-limiting example of a process for rendering a network responsive resource is provided hereafter, although it is understood that numerous other rendering processes may be utilized. As one example, when rendering a network responsive resource, a document object model (DOM) is formed from the HTML code within the network responsive resource. Styles are loaded and parsed to form a cascading style sheet (CSS) object module (CSSOM). A rendering tree is created on top of the DOM and CSSOM, where the rendering tree represents a set of objects to be rendered. The rendering tree generally reflects the DOM structure but for invisible elements such as header tags or certain other elements. Text rings are represented in the rendering tree as separate renderers or frames. Each rendering object contains a corresponding DOM object or a text block plus calculated styles, such that the renderer tree describes the visual representation of the DOM. For each rendering tree element, its coordinates are calculated, referred to as a layout. The browser may use a flow method that may utilize one pass to lay out all of the elements, or alternatively multiple passes (e.g., in connection with tables). The browser then implements a painting process to display the resulting information.

The term "rendering engine" refers to a program that performs rendering. A rendering engine is generally implemented within, or in connection with, a browser. The rendering engine may also be referred to as a layout engine. The program renders marked up content (such as HTML, XML, image files, etc.) and formatting information (such as CSS, XSL, etc.). A rendering or layout engine is a typical component of web browsers, email clients, e-book readers, on-line help systems or other applications that display (and edit) web content. The rendering engine may wait for all content data to be received before rendering a page, or may begin rendering before all content data is received. This can result in pages changing as more data is received, such as images being filled in or a flash of un-styled content if rendering begins before formatting information is received.

The terms "responsiveness" and "responsiveness information" refer to one or more characteristics associated with a browser session. Non-limiting examples of responsiveness characteristics include network bandwidth, load times, an amount of traffic experienced on a network, an amount of traffic experienced by a particular network resource, a load experienced by networking equipment supporting the particular network path and the like. A responsiveness of a browser session may vary based on numerous characteristics. Also, responsiveness may include information characterizing a load experienced by a resource manager and/or client device. Non-limiting examples of responsiveness information include an amount/level of memory utilization, an amount/level of CPU activity, an amount/level of hard drive utilization, an amount/level of background operations performed by the CPU (e.g., performing an anti-virus scan), a nature of background operations performed by the CPU, etc. Additionally or alternatively, the responsiveness information may include network load experienced by the client device.

The term "load time" refers to a time interval between start and end events of interest. For example, a start event of interest may correspond to the time at which a request is conveyed from a client device (or remote device). An end event of interest may correspond to a point in time at which a rendered image/output is displayed at the client device, where the rendered image/output is generated from a complete network responsive resource. Additionally or alternatively, the end event of interest may correspond to a point in time at which a rendered image/output is displayed for a desired portion of a complete network responsive resource. For example, the end event of interest may correspond to the point in time at which a primary portion (e.g., text and/or still images and graphics) of the content from a webpage is displayed, even though additional secondary portions (e.g., audio and video content, advertisements) of the content have not yet been displayed. As another example, the end event of interest may correspond to the point in time at which a video begins to display within a rendered image. As another example, the end event of interest may correspond to the point in time at which a portion of the content is displayed and the user interface of the browser allows navigation through the content, even though additional content may not yet be rendered and displayed.

The term "local browser" refers to a browser implemented on a client device.

The term "virtual browser" refers to a browser implemented on a remote device that is separate, distinct and remote from the client device.

The term "session" refers to the different states of a network resource (e.g., application) during a time in which a user is interacting with the resource or application. A session may represent an instance of the interaction of a user with a resource or application. A web session may be defined by a data structure that a resource or application uses to store temporary data that is useful only during the time a user is interacting with the resource or application, where the data structure is specific to the user. For example, a user name may be stored in the session. As another example, data may be stored in connection with a session to save states between pages (e.g., between pages of a payment process for example). A data structure for a session is stored in volatile memory to afford quick access that is allocated to each user who is using the application. When a user stops interacting with a resource or application (e.g., closes a browser or navigates away from a Website), the resource manager destroys the session data structure. Optionally, different storage mechanisms and implementations may be used with different applications. The temporary storage could be on a file system in text files, on a database or in the internal memory of the program executing the application.

The session may have a key-value pair data structure (e.g., a hashtable where each user gets a hashkey to enter their data). The hashkey represents one type of "session ID". Every user is able to access only their session. The session can be stored on the server, or on the client. If on the client, the session will be stored by the browser, most likely in cookies. Alternatively, a session may be stored on a server, where the Session IDs are created and managed by the server.

The term "local browser session" refers to a browser session between a local browser on a client device and a resource manager, in which request are conveyed from the client device to the resource manager and network responsive resources are returned from the resource manager to the client device.

The term "virtual browser session" refers to a browser session between a virtual browser on a remote device and a resource manager, in which requests are conveyed from the remote device to the resource manager and network responsive resources are returned from the resource manager to the virtual browser on the remote device. The virtual browser may be saved locally, accessed over a proprietary network or accessed over the Internet as a public cloud service. The virtual browser can be accessed in either anonymous or authenticated modes. In anonymous mode all settings, cookies, bookmarks and history are cleared after a session. In an authenticated mode, personal settings, cookies and history are saved and carry over between sessions because they are tied to a specific end user's account.

The term "session transfer related data" refers to data and other information passed between local and virtual browsers on local and remote devices, respectively, in connection with transferring a local browser session to a virtual browser. Non-limiting examples of session transfer related data include an address or other linking information identifying a network resource for a current browser session, a session ID assigned to a current browser session at the local browser, client device credentials (e.g., IP address, type of browser, browser version, mobile/desktop device) and the like.

System Overview

Figure 1:
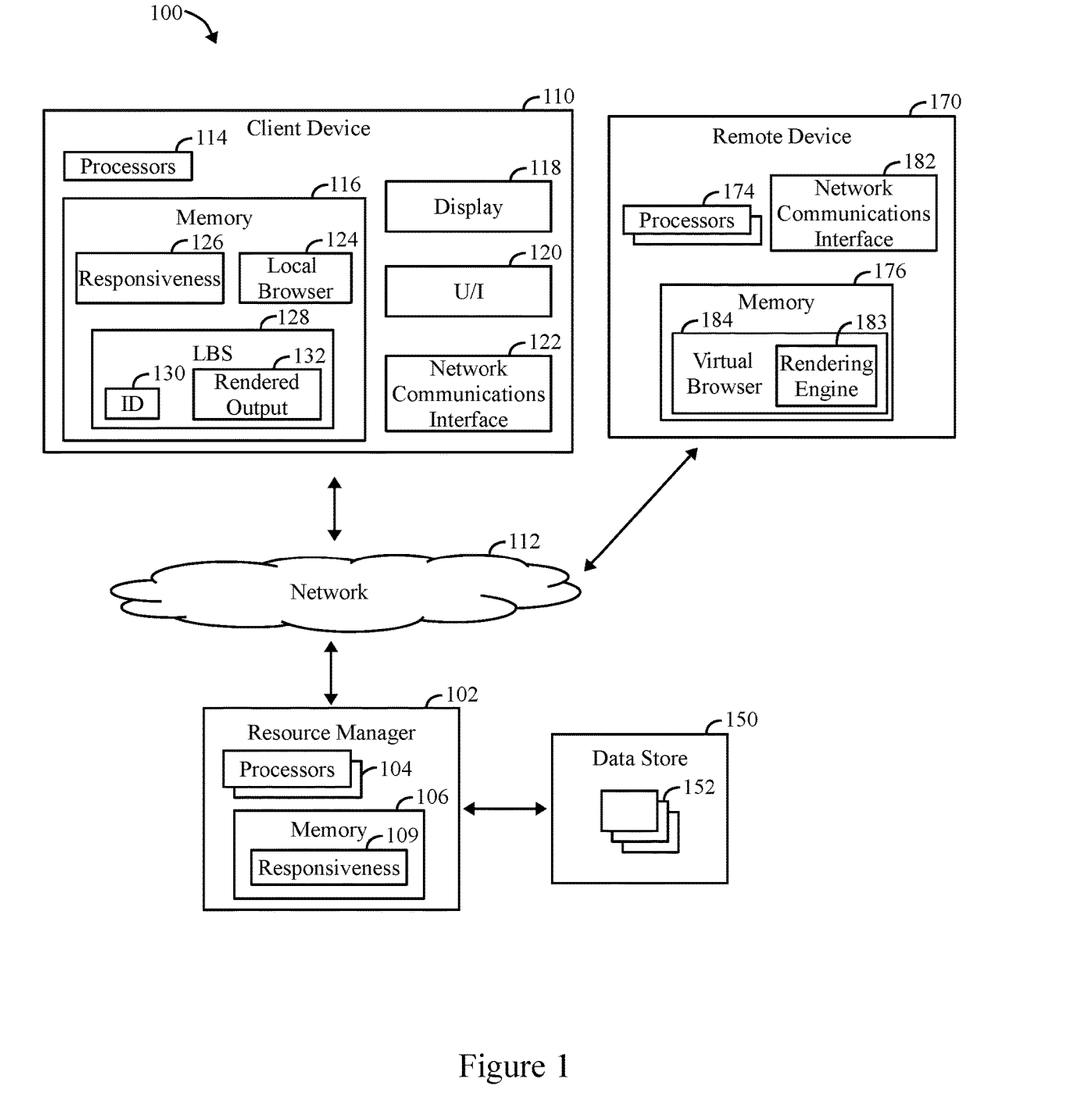
FIG. 1 illustrates a system 100 implemented in accordance with embodiments herein to transfer between local and virtual browser sessions based on responsiveness.

FIG. 1 illustrates a system 100 implemented in accordance with embodiments herein to transfer between local and virtual browser sessions based on responsiveness. The system 100 includes one or more resource managers 102 that manage and otherwise provide access to one or more data stores 150 that store network resources 152. The resource manager 102 communicates with client devices 110 and remote devices 170 through one or more networks 112 to provide access to the network resources 152. The network 112 may represent the World Wide Web, a local area network, a wide area network and the like. The client device 110 may represent various types of electronic devices including, but not limited to, smart phones, desktop or laptop computers, tablet devices, smart TVs and the like. The remote device 170 may represent various types of electronic devices including, but not limited to, servers, computer networks, workstations, data centers, cloud computing systems, smart phones, desktop or laptop computers, tablet devices or other network based computing environment. The remote device 170 may represent a single computer system or a collection of computer systems located at a common location or geographically distributed. The resource manager 102 may represent a server or other network based computing environment. The resource manager 102 may represent a single computer system or a collection of computer systems located at a common location or geographically distributed.

The resource manager 102 includes one or more processors 104 and memory 106, among other structures that support operation of the resource manager 102. The memory 106 includes an operating system, instructions to manage the data store 150 and instructions to implement the methods described herein. The memory 106 also stores responsiveness information 109 related to historic and/or present browser sessions. For example, the responsiveness information 109 may include historic load times experienced by a particular client device or numerous client devices. The responsiveness information 109 may record multiple historic load times in connection with a particular webpage, website and the like. As another example, the responsiveness information 109 may include historic network available speed information, such as based on historic bandwidth availability and usage patterns of users.

The data store 150 may store the network resources 152 organized in various manners and related to a wide variety of topics and content. As non-limiting examples, collections of network resources 152 may be organized and maintained in connection with websites, webpages, blogs, social media and the like. The network resources 152 may be organized and maintained within any manner of data sources, such as data bases, text files, data structures, libraries, relational files, flat files and the like.

The resource manager 102 receives requests from various client devices 110 and returns network responsive resources 152 in connection there with. It is recognized that the resource manager 102 performs other operations, not described herein, such as operations associated with maintaining resources and the like. The resource manager 102 tracks and records historic past responsiveness information in connection with past browser sessions. The resource manager 102 may provide the past responsiveness information 109, to a client device 110, in order for the client device 110 to determine whether a current browser session is exhibiting normal or slow responsiveness. Optionally, the resource manager 102 may maintain a collection of responsiveness information for multiple prior browser sessions. For example, the responsiveness information may include multiple normal load times that are recorded by the resource manager 102 in connection with multiple prior browser sessions. Additionally or alternatively, the normal load times may be recorded by corresponding client devices 110 and then conveyed to the resource manager 102 in order to be maintained in the collection in the memory 106 of the resource manager 102. As one example, the collection of responsiveness information for past browser sessions may be maintained in a database or other file structure.

The client device 110 includes one or more processors 114, memory 116, a display 118, a user interface 120, a network communications interface 122, and various other mechanical components, electrical circuits, hardware and software to support operation of the client device 110. The memory 116 includes an operating system and instructions to implement the processes described herein. The memory 116 also stores one or more application programs to implement a browser 124, as well as other software, information and data as described herein. In accordance with embodiments herein, the processors 114 determine and update responsiveness information 126 when a browser session is first initiated and/or continuously throughout. The responsiveness information 126 is indicative of various characteristics of a browser session experienced by the browser 124. The memory 116 maintains the responsiveness information 126.

The local browser 124 initiates a browser session 128 with a resource manager 102. For example, a request to initiate a browser session may represent an address to a webpage, a link selected by the user, the act of opening a Facebook application, logging into an airline, hotel, bank, rental car application or website, and the like. Among other things, the local browser 124 maintains a session ID 130 in connection with the local browser session 128. The local browser 124 generates and sends requests from the user in connection with the local browser session 128. The client device 110 receives network responsive resources in connection with the requests. The browser 124 parses a network responsive resource to identify content components therein that requires additional processing. For example, the content components may merely represent links to additional network resources to be downloaded. Consequently, to build one network responsive resource, the local browser 124 may need to send multiple requests to the resource manager 102 for additional content. Once all of the content components are downloaded, the local browser 124 renders the network responsive resource to form a rendered output 132. The rendered output 132 is loaded/painted into a display buffer in connection with displaying content on the display 118.

As explained herein, a browser session may exhibit undesirable characteristics. For example, an unduly long period of time may elapse between the point in time when an initial request is sent for a network responsive resource and the rendered output 132 is loaded and displayed for the network responsive resource. An excessively long load time is one example of poor browser session responsiveness. Other non-limiting examples of poor browser session responsiveness include a user interface locking or freezing, an inability to scroll through content on a webpage, and the like. The term responsiveness and a list of non-limiting examples of responsiveness characteristics are provided above in the Terms Section. The client device 110 measures a responsiveness in connection with one or more requests sent to the resource manager 102 and in connection with one or more network responsive resources 128 that are returned. As one example, the client device 110 compares the measured responsiveness to one or more corresponding thresholds related to one or more characteristics of the browser session. For example, separate thresholds may be defined for network bandwidth, load times, traffic levels and the like. The client device 110 determines whether the responsiveness of a local browser session satisfies or falls below one or more of the thresholds. Based thereon, the client device 110 may transfer the local browser session from the local browser 124 to a virtual browser 184 implemented on the remote device 170. When the local browser session is transferred to the virtual browser 184, a virtual browser session is formed.

Additionally or alternatively, the client device 110 may transfer a local browser session to a virtual browser session based on predictive responsiveness information. The predictive responsiveness information represents a prediction or expectation of responsiveness that will occur at some point in the future while the client device 110 still engages the resource manager 102 for additional resources. For example, the processors 114 may track browser sessions implemented by the client device 110 and determine that at certain times of day, certain days of the week and the like, browser sessions become excessively slow and/or nonresponsive. When the processors 114 expect a reduction in responsiveness (e.g., heavy traffic during one of these high traffic time periods), the client device 110 may transfer the local browser session to a virtual browser even though the instantaneous responsiveness may not yet be slow.

In some embodiments, the client device 110 may transfer to a virtual browser session based on prior responsiveness information received from the resource manager 102. For example, when the client device 110 initiates a new or continues an old browser session, the resource manager 102 may return one or more initial network responsive resources (e.g., webpages). In connection there with, the resource manager 102 returns may return historic/prior responsiveness information related to the particular or type of network responsive resource requested by the client device 110. For example, the historic/prior responsiveness information may indicate a normal load time experienced by other client devices when accessing the current webpage.

As another example, the historic/prior responsiveness information may indicate a normal load time experienced by the present client device 110 during one or more prior browser sessions. For example, the client device 110 sends a HTTP request, which include data concerning the client device 110 (IP address, type of browser, browser version, mobile/desktop device). The resource manager 102 may utilize the data concerning the client device 110 and/or the HTTP request to identify relevant historic/prior responsiveness information to be returned.

Optionally, to establish initial responsiveness information, a client device 110 may implement one or more baseline browser sessions with various resource managers 102. During the baseline browser session, the client device 110 and/or resource manager 102 record baseline responsiveness in connection with the baseline browser session. For example, baseline responsiveness may include load times for various webpages accessed during the baseline browser session. Baseline responsiveness information may include available bandwidth experienced during the browser session and the like. The baseline responsiveness information may be stored at the resource manager 102 in connection with the particular resource and/or in connection with the particular client device. Additionally or alternatively, the baseline responsiveness information may be stored at the client device.

Additionally or alternatively, any and/or all browser sessions implemented by the client device 110 may be treated as a baseline browser session with baseline responsiveness information stored in connection there with. For example, each time the client device 110 implement a browser session with a resource manager 102, the responsiveness information is stored as baselines at the client device 110 in connection there with.

In some embodiments, the client device 110 may transfer a portion of a browser session to a virtual browser 184 on the remote device 170. For example, the client device 110 may determine that a first portion (e.g., certain webpages) exhibits slow load times or slow responsiveness, while a second portion (e.g., other webpages) exhibits normal load times and normal responsiveness. When certain portions of a browser session are normal while other portions are slow, the client device 110 may determine to transfer the first portions of the browser session to the virtual browser while maintaining, at the local browser, the second portions of the browser session.

The remote device 170 include one or more processors 174, memory 176, a display, a user interface, a network communications interface 182, and various other mechanical components, electrical circuits, hardware and software to support operation of the remote device 170. The memory 176 includes an operating system and instructions to implement the processes described herein. The memory 176 also stores one or more application programs to implement a virtual browser 184, as well as other software, information and data as described herein. The virtual browser 184 includes a rendering engine 183 that performs rendering operations in connection with forming rendered outputs from network responsive resources.

The virtual browser 184 receives transfer of the local browser session from the local browser 124 at the client device 110. The virtual browser 184 converts the local browser session to a virtual browser session. In connection with the virtual browser session, the virtual browser 184 receives requests from the local browser 124 at the client device 110. The virtual browser 184 passes the requests to the resource manager 102. The virtual browser 184 receives a network responsive resource from the resource manager 102 in response to the requests. The virtual browser 184 executes any scripts within the network responsive resource and the rendering engine 183 renders the network responsive resource to form one or more rendered image/output. The virtual browser 184 then passes the rendered image/output to the local browser 124 at the client device 110. Thereafter, the virtual browser 184 waits for additional requests from the local browser 124 in connection with the virtual browser session.

A more detailed implementation of the transfer of the local browser session to the virtual browser and subsequent maintenance of the virtual browser session is described hereafter.

Transfer Processes

Figure 2A:
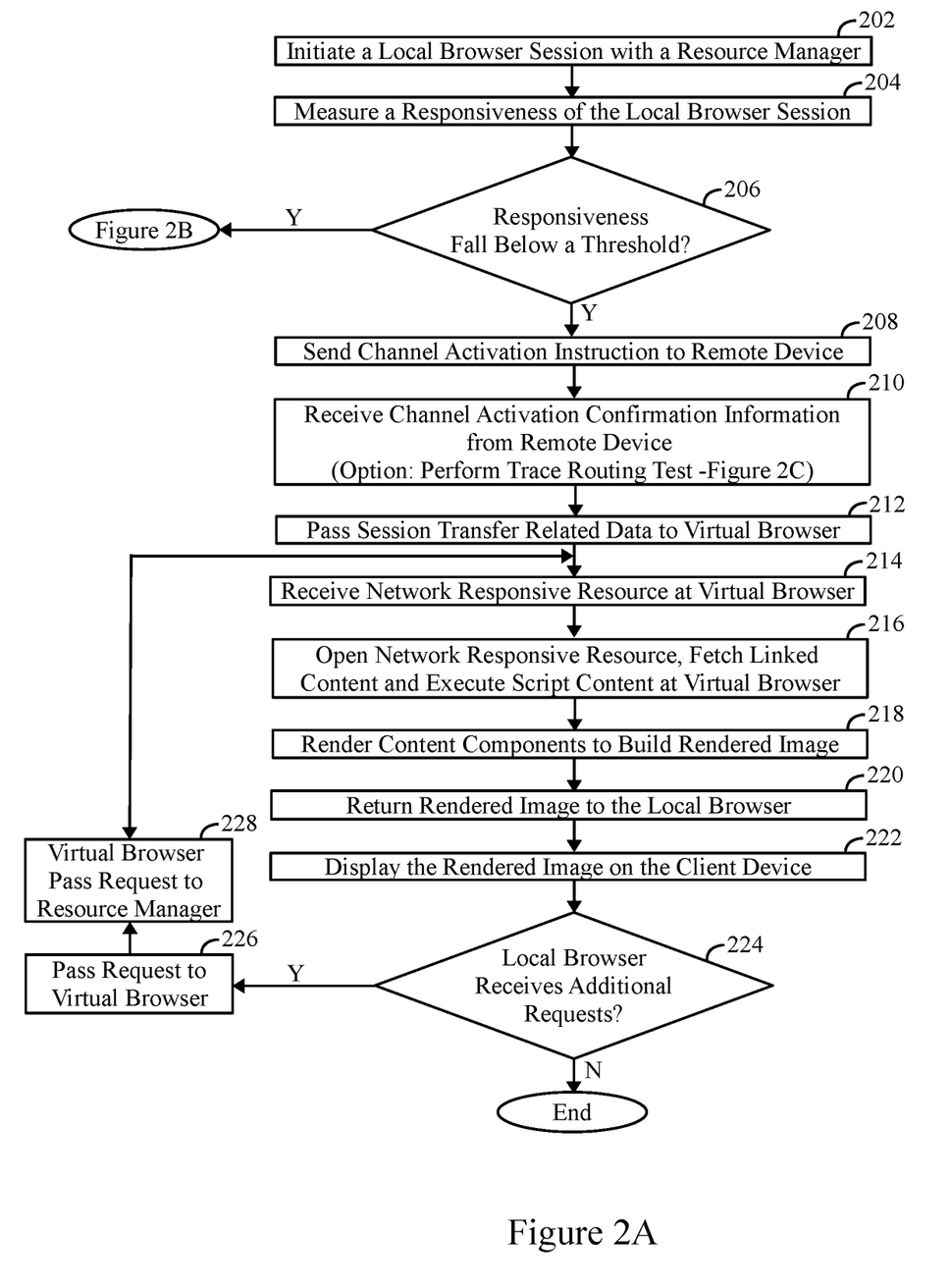
FIG. 2A illustrates a process carried out by a local device when transferring a browser session to a virtual browser in accordance with an embodiment herein.
Figure 2B:
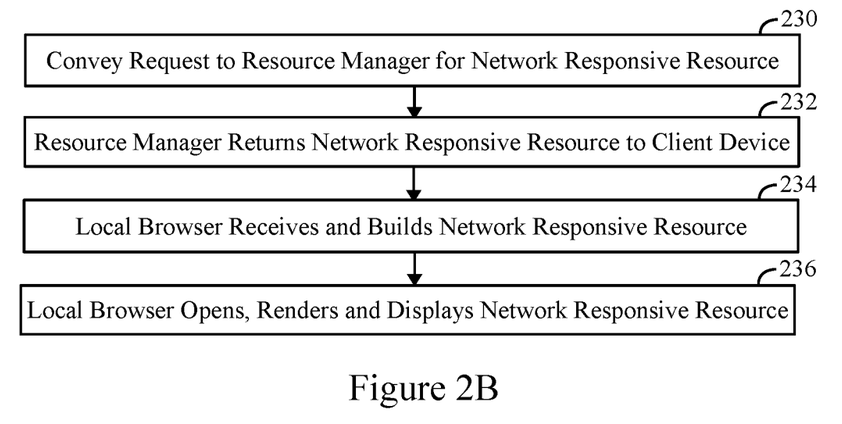
FIG. 2B illustrates a process carried out by a local device when not implementing browser session transfer to a virtual browser, or returning a virtual browser session to the local browser, in accordance with an embodiment herein.

FIGS. 2A and 2B illustrate a process for transferring between local and virtual browser sessions in accordance with embodiments herein. The operations of FIGS. 2A and 2B may be implemented by processors, hardware and circuits within the systems described in the various embodiments herein. The operations of FIGS. 2A and 2B may be performed continuously or periodically. For simplicity purposes, the operations of FIGS. 2A and 2B, will be described in connection with one request, however it is recognized that a client device 110 and remote device 170 may provide multiple requests in connection with displaying one resource (e.g., webpage). Optionally, the operations of FIGS. 2A and 2B may be performed upon select requests from a client device 110, upon every request from a client device 110, upon groups of requests from a client device 110 or otherwise. Optionally, the operations of FIGS. 2A and 2B may be performed in parallel for multiple client devices 110 and/or multiple remote devices 170.

At 202, the local browser 124 of the client device 110 initiates a local browser session with a resource manager 102. The local browser session may be initiated in connection with various types of operations and from various types of client devices 110. For example, a client device 110 (e.g., a smart phone, personal computer and the like) may operate the local browser 124, through which a user seeks to obtain content from a website or other network resource. As one example, the request may represent a request from a local browser 124 for a new webpage. As another example, the local browser 124 on the client device 110 may have already received a webpage as a network responsive resource, but the webpage includes one or more linking components. To complete presentation of the initial webpage, the local browser 124 may need to convey additional requests in connection with the linking components to obtain additional network responsive resources, which may represent an image, video, audio, or other content to be presented within or in connection with the original webpage accessed.

At 204, the one or more processors of the client device 110 measure a responsiveness of the local browser session. For example, the client device 110 may measure one or more of network bandwidth, load times, an amount of traffic experienced on a network, an amount of traffic experienced by a particular network resource, a load experienced by networking equipment supporting the particular network path and the like. A responsiveness of a browser session may vary based on numerous other characteristics.

At 206, the one or more processors of the client device 110 determine whether the responsiveness of the local browser session falls below one or more thresholds. The determination at 206 is based, at least in part, on the responsiveness information collected by the client device 110. Optionally, the determination at 206 may be based on historic/past responsiveness information provided by the resource manager 102. As one example, the client device 110 may determine that a load time for a webpage has fallen below a webpage load time threshold. A load time threshold may be defined as an absolute amount of time or a percentage amount of time relative to a baseline load time. For example, a load time threshold may indicate a number of seconds between start and end events of interest related to an individual user request (e.g., the time between the user selects a link and a responsive rendered image is presented in connection with the link). Additionally or alternatively, the determination at 206 may be based on bandwidth thresholds, network traffic thresholds, resource specific thresholds, networking equipment load thresholds and the like. For example, a determination may be made that the available network bandwidth has fallen below a bandwidth threshold. As another example, the determination may be based on the utilization information for the local device (e.g., whether the local device is experiencing high CPU use, low memory availability, low network utilization, etc.).

Additionally or alternatively, the client device 110 may analyze multiple types of responsiveness information relative to corresponding thresholds and apply a weighting factor that is used to determine whether to implement a virtual browser session. For example, the same or different weights may be applied to relations between the various responsiveness characteristics. When the client device 110 determines to implement a virtual browser session, flow branches to 208. When the client device 110 determines not to implement a virtual browser session, flow branches to 230 (FIG. 2B).

At 208 and 210, the client device 110 and the remote device 170 establish a remote session. Non-limiting examples of the types of remote sessions that may be established include remote desktop sessions, remote application sessions, remote terminal sessions, remote browser sessions, and the like. As one example to establish a session, at 208, the client device 110 sends a channel activation instruction to the remote device 170. The channel activation instruction directs the remote device 170 to open the virtual browser 184 and establish a session channel between the virtual browser 184 and the local browser 124. The client device 110 may retain predetermined identification information for a particular remote device 170 and virtual browser 184 to be used in connection with addressing a remote device 170.

Optionally, at 210, the client device 110 receives channel activation confirmation information from the remote device 170. The channel activation confirmation information may include, as one non-limiting example, identification and configuration information related to the remote device 170 and the virtual browser 184. Optionally, the exchange of channel activation instructions and channel activation confirmation information may correspond to the information and exchange utilized in connection with establishing a remote session, such as a remote desktop session, desktop-sharing session, remote terminal session, remote application session, and the like. For example, a remote session may connect through various platforms, such as the Axeda® Platform to remote devices configured to support remote sessions. As a non-limiting example, the operation at 208 may utilize an application bridge. The operation at 208 may include port remapping at the remote device 170.

During a remote desktop session, the remote device 170 enables the local device 110 to view the screen or desktop of the remote device 170. The remote desktop session can be started on a remote asset with ("attended") or without ("unattended") operator intervention. During a remote application session, the client device 110 connects to the virtual browser 184 to transfer the local browser session. As one non-limiting example, a remote application (e.g., Axeda® Application Bridge) may be utilized to provide a virtual bridge between the client device 110 and the virtual browser 184. When using a remote application session, one implementation may include the following. When the client device 110 conveys a channel activation instruction, the remote device 170 returns a remote access session ID and one or more communications ports defined for communication between the local device 110 and the virtual browser 184. Thereafter, the remote access session ID and communications port are utilized for subsequent access by the client device 110 to the virtual browser 184. It is recognized that other protocols may be utilized to establish remote desktop sessions, remote application sessions, remote terminal sessions and remote browser sessions.

Figure 2C:
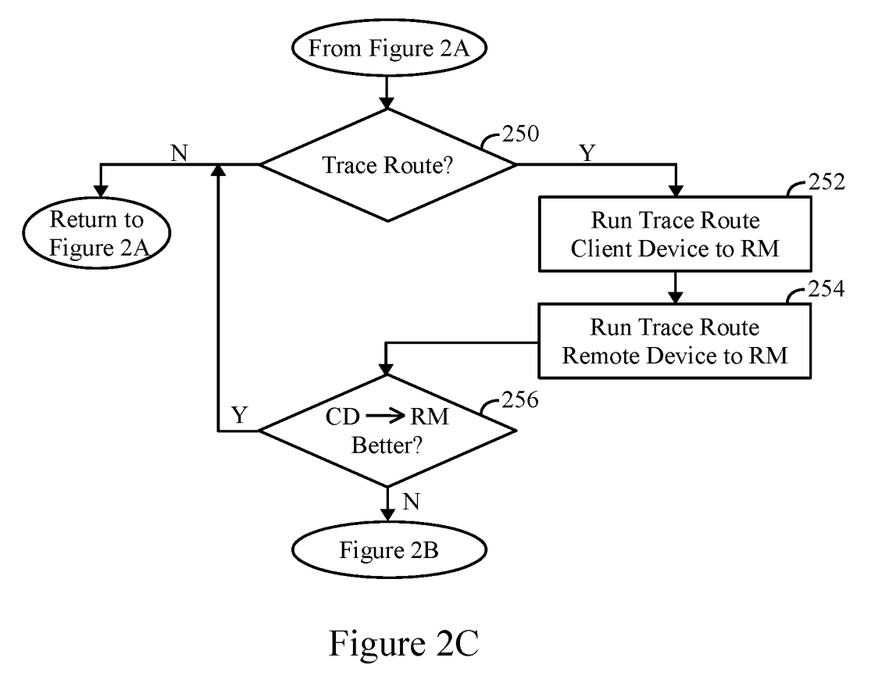
FIG. 2C illustrates a route tracing process implemented in accordance with alternative embodiments herein.

Optionally, once a channel is established between the client and remote devices 110, 170, a trace routing test may be implemented (e.g., in connection with FIG. 2C). The trace routing test traces first and second routes, where the first route is between the client device 110 and the resource manager 102. The second route is between the remote device 170 and the resource manager 102. As explained hereafter, in connection with FIG. 2C, the client device may utilize the trace routing test results to determine which of the routes affords better responsiveness (e.g., faster load times, more bandwidth, etc.). Based on the determination of the better route, the client device 110 may then determine whether to continue transfer of the present local browser session to a virtual browser session.

At 212, the local browser 124 passes session transfer related data to the virtual browser 184. The session transfer related data is utilized by the virtual browser 184 to complete transfer of the local browser session. The transfer of the local browser session may be implemented in various manners. For example, the virtual browser 184 may take over control and act as a proxy or substitute for the local browser 124, thereby continuing an existing browser session initiated at the local browser 124, but over a communications path between the resource manager 102 and the remote device 170. To take over control and act as a proxy for the local browser 124, the virtual browser 184 utilizes the same device, browser and session related identification and configuration information as to the local browser 124 and client device 110. In accordance with this embodiment, the virtual browser 184 forms a virtual browser session by taking over control and acting as a proxy within the previously initiated local browser session.

Optionally, to transfer the local browser session, the virtual browser 184 may initiate a new browser session that substantially duplicates any preceding request associated with the current state of the local browser session already provided by the local browser 124. For example, the local browser session is assigned a first session ID. The client device 110 instructs the virtual browser 184 to initiate a new browser session that is assigned a second session ID. The client device 110 provides, to the virtual browser 184, one or more requests that were utilized by the local browser 124 to initiate the local browser session. The virtual browser 184 utilizes the one or more requests to substantially duplicate the local browser session to form the virtual browser session. For example, the virtual browser 184 may send an HTTP request for the same resource as requested by the local browser 124. To the extent that additional information is needed to activate a particular resource (e.g., webpage), the virtual browser 184 may provide the same additional information as previously provided by the local browser 124. In accordance with this alternative embodiment, the virtual browser 184 forms a virtual browser session by initiating and creating a new browser session that is substantially identical to the local browser session.

At 214, the remote device 170 and virtual browser 184 receive a network responsive resource from the resource manager 102. At 216, the virtual browser 184 opens the network responsive resource, fetches any linked content components, and executes any scripted content components. At 218, the rendering engine 183 of the virtual browser 184 renders content components of the network responsive resource to form a rendered image/output for display.

At 220, the virtual browser 184 returns the rendered image/output to the local browser 124 at the client device 110. At 222, the local browser 124 displays the rendered image/output on the display of the client device 110. At 224, the local browser 124 determines whether any additional requests, for additional network responsive resources, are received from the user at the client device 110 in connection with a current browser session. When an additional request is received, flow branches to 226 where the request is passed to the virtual browser 184. At 228, the virtual browser 184 passes the request to the resource manager 102. Thereafter, flow returns to 214 where the virtual browser waits to receive the next network responsive resource and the operations at 214-224 are repeated. Alternatively, at 224, when no additional request is received, the process may end.

In connection with the operations of FIG. 2A, a local browser session is monitored and when a responsiveness of the local browser session falls below one or more thresholds, the browser session is switched to a virtual browser at a remote device 170. The transfer to the virtual browser allows downloading of resources (e.g., website files, etc.) to be transferred to another device, namely the remote device 170. The virtual browser 184 on the remote device 170 mirrors the operation of the local browser 124.

Additionally or alternatively, the local browser 124 may periodically measure the responsiveness of the virtual browser session. When the responsiveness of the virtual browser session remains above the thresholds discussed herein, the virtual browser session may be continued. However, in the event that the responsiveness of the virtual browser session also falls below the thresholds, optionally, the virtual browser session may be terminated and transfer returned to the local browser session between the local browser 124 and the resource manager 102.

FIG. 2B illustrates a process carried out by a local device when not implementing browser session transfer to a virtual browser, or returning a virtual browser session to the local browser, in accordance with an embodiment herein. At 230, the local browser 124 conveys a request to the resource manager 102 for a network responsive resource. At 232, the resource manager 102 returns the network responsive resource to the client device 110. At 234, the local browser 124 receives and builds a network responsive resource. At 236, the local browser 124 opens, renders and displays the network responsive resource.

FIG. 2C illustrates a route tracing process implemented in accordance with alternative embodiments herein. At 250, a decision is made at the client device 110 whether to implement route tracing. When trace routing is not desired, flow returns to the process of FIG. 2A. When route tracing is desired, flow moves to 252. At 252, the client device 110 runs a first trace routing test for the communications path between the client device 110 and the resource manager 102. At 254, the remote device runs a second trace routing test for the communications path between the remote device 170 and the resource manager 102. At 256, the client device determines which of the trace routing test indicate a faster/better route. When the faster/better route is between the remote device 170 and resource manager 102, flow returns to FIG. 2A. Alternatively, when the trace routing test indicates that the path between the client device 110 and the resource manager 102 is the faster/better route, flow moves to FIG. 2B.

Figure 2D:
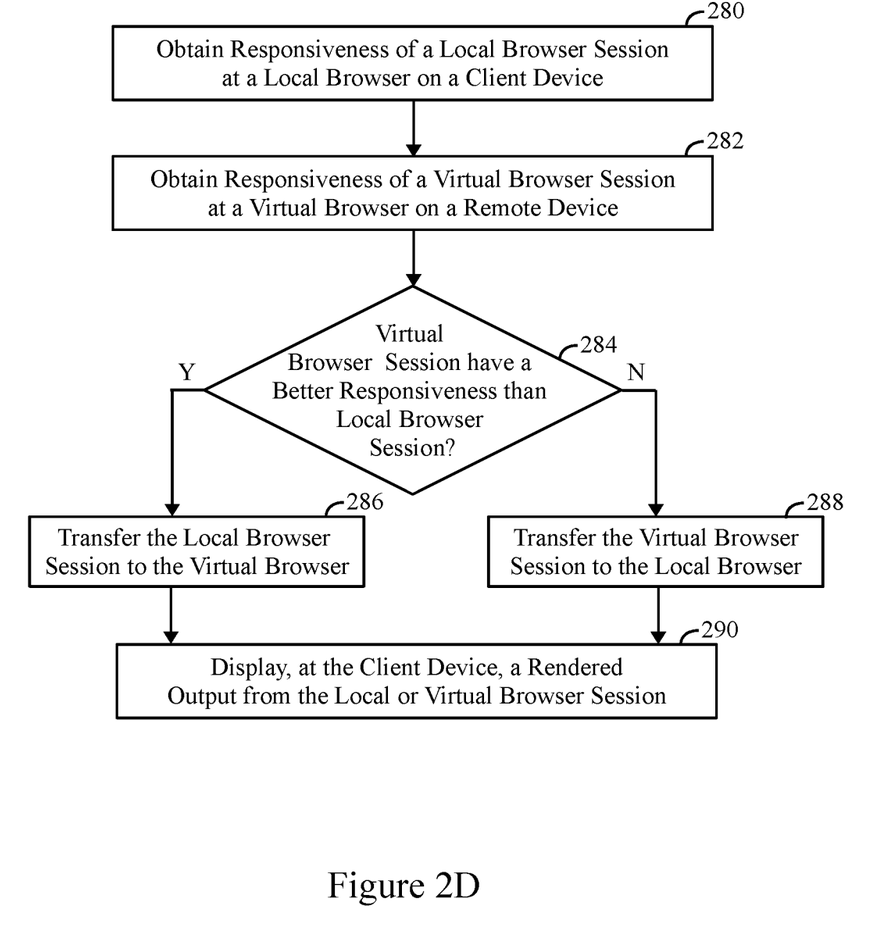
FIG. 2D illustrate a process for managing transfer between local and virtual browser sessions at local and virtual browsers based on corresponding responsiveness information in accordance with embodiments herein.

FIG. 2D illustrate a process for managing transfer between local and virtual browser sessions at local and virtual browsers based on corresponding responsiveness information in accordance with embodiments herein. The operations of FIG. 2D to be implemented at an intermediate point during a virtual browser session initiated in accordance with the operations described herein. Additionally or alternatively, the operations of FIG. 2-D may be implemented independent of any other browser session, such as when and "test browser session" is initiated at the local and virtual browsers, where the test browser session performs the same duplicate request and accesses the same network resources at both the local and remote devices.

At 280, the one or more processors of the local or remote devices obtain a responsiveness of a local browser session at a local browser on the client device. For example, the responsiveness may be obtained by the local browser by performing a responsiveness measurement. As another example, the responsiveness information may be obtained by the virtual browser when the local browser transmits the local browser responsiveness information to the virtual browser.

At 282, the one or more processors of the local or remote devices 110, 170 obtain a responsiveness of a virtual browser session at virtual browser on the remote device. For example, the responsiveness may be obtained by the virtual browser by performing a responsiveness measurement. As another example, the responsiveness information may be obtained by the local browser when the virtual browser transmits the virtual browser responsiveness information to the local browser.

At 284, the one or more processors of the local or remote devices 110, 170 compare the responsiveness information obtained at 280 and 282. When the responsiveness information indicates that the virtual browser at the remote device exhibits better responsiveness than the local browser, flow moves to 286. When the responsiveness information indicates that the local browser at the local device exhibits better responsiveness than the virtual browser, flow moves to 288. The comparison of responsiveness information may be based on various criteria. For example, the determination at 284 may be based on which browser exhibits shorter load times, which browser experiences wider bandwidth, lower processor utilization and the like. Additionally or alternatively, the client device 110 and/or remote device 170 may analyze multiple types of responsiveness information and apply a weighting factor that is used to determine whether to implement a local or virtual browser session.

At 286, the one or more processors of the local and/or remote devices 110, 170 transfer the local browser session to the virtual browser as described herein in connection with various embodiments. At 288, the one or more processors of the local and/or remote devices 110, 170 transfer the virtual browser session back to the local browser in connection with various embodiments herein. The transfers at 286, 288 may include the exchange of one or more session IDs, channel activation instructions and channel activation confirmation information as described herein. For example, the transfer includes transferring the local browser session to the virtual browser when the responsiveness of the virtual browser session exceeds the responsiveness of the local browser session. For example, transfer includes transferring the virtual browser session to the local browser when the responsiveness of the local browser session exceeds the responsiveness of the virtual browser session. At 290, rendered outputs from the local or virtual browser sessions are displayed at the client device 110 in accordance with operations described herein.

Cloud-Based System

Figure 3:
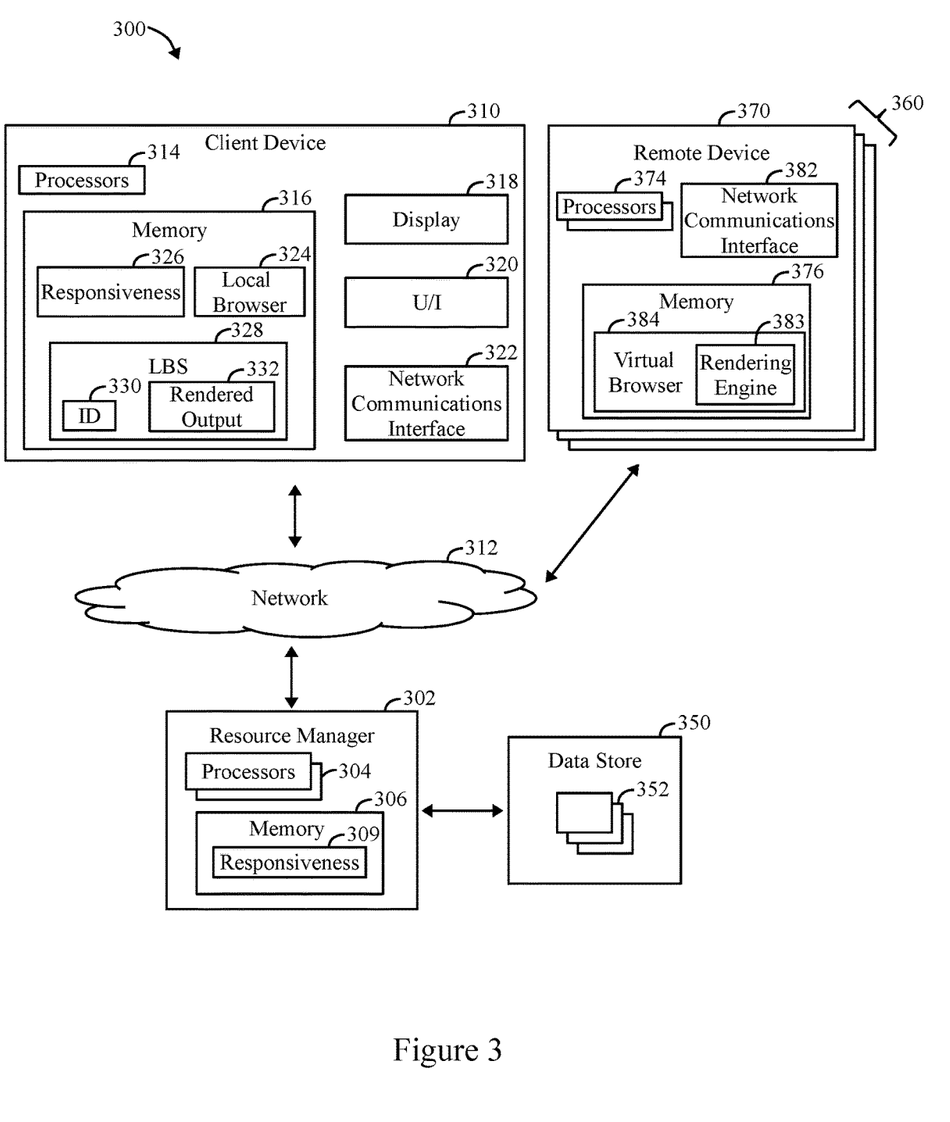
FIG. 3 illustrates a cloud-based system implemented in accordance with an alternative embodiment.

FIG. 3 illustrates a cloud-based system implemented in accordance with an alternative embodiment. The system 300 includes one or more resource managers 302 that manage and otherwise provide access to one or more data stores 350 that store network resources 352. The resource manager 302 communicates with client devices 310, cloud-based resources 360, and remote devices 370 through one or more networks 312 to provide access to the network resources 352. The resource manager 302 includes one or more processors 304 and memory 306 that may include responsiveness information 309 as well as other data, instructions and content as discussed herein.

The client device 310 include one or more processors 314, memory 316, a display 318, a user interface 320, a network communications interface 322, and various other mechanical components, electrical circuits, hardware and software to support operation of the client device 310. The memory 316 includes an operating system and instructions to implement the processes described herein. The memory 316 also stores one or more application programs to implement a browser 324, as well as other software, information and data as described herein. In accordance with embodiments herein, the processors 314 determine and update responsiveness information 326 when a browser session is first initiated and/or continuously throughout a browser session. The responsiveness information 326 is indicative of various characteristics of a browser session experienced by the browser 324. The memory 316 maintains the responsiveness information 326.

The local browser 324 initiates a browser session 328 with a resource manager 302. Among other things, the local browser 324 maintains a session ID 330 in connection with the local browser session 328. The local browser 324 generates and sends requests from the user in connection with the local browser session. The client device 310 receives network responsive resources in connection with the requests. The local browser 324 parses the network responsive resource to identify content components that require additional processing. For example, the content components may merely represent links to additional network resources to be downloaded. Consequently, to build one network responsive resource, the local browser 324 may need to send multiple requests to the resource manager 302 for additional content. Once all of the content components are downloaded, the local browser 324 renders the network responsive resource to form a rendered output 332. The rendered output 332 is loaded/painted into a display buffer in connection with displaying content on the display 318.

The client device 310 measures a responsiveness in connection with one or more requests sent to the resource manager 302 and in connection with one or more network responsive resources 328 that are returned. The client device 310 compares the measured responsiveness to one or more corresponding thresholds related to one or more characteristics of the browser session. Based thereon, the client device 310 transfers the local browser session from the local browser 324 to a cloud-based resource 360 that supports multiple remote devices 370 and multiple virtual browsers 384. When the local browser session is transferred to the virtual browser 324, a virtual browser session is formed.

The cloud-based resource 360 may represent a single computer system or a collection of computer systems located at a common location or geographically distributed. The cloud-based resource 360 and remote devices 370 include one or more processors 374, memory 376, a display, a user interface, a network communications interface 382, and various other mechanical components, electrical circuits, hardware and software to support operation of the remote device 370. The memory 376 includes an operating system and instructions to implement the processes described herein. The memory 376 also stores one or more application programs to implement a virtual browser 384, as well as other software, information and data as described herein. The virtual browser 384 include a rendering engine 383 to form rendered outputs from network responsive resources.

In the embodiment of FIG. 3, the cloud-based resource 360 determines which remote device 370 and virtual browser 384 to pair with the client device 310 based on information received from the client device 310 in connection with, or separate from, the channel activation instruction. As one example, the cloud-based resource 360 may identify a remote device 370 and virtual browser 384 based on the geographic location of the client device 310, the type and version of the client device 310 and local browser 324, a nature and content of the local browser session and the like.

Once a remote device 370 is selected, the virtual browser 384 receives, from the local browser 324 at the client device 310, transfer of the local browser session. The virtual browser 384 converts the local browser session to a virtual browser session. In connection with the virtual browser session, the virtual browser 384 receives requests from the local browser 324 at the client device 310. The virtual browser 384 passes the requests to the resource manager 302. The virtual browser 384 receives a network responsive resource from the resource manager 302 in response to the requests. The virtual browser 384 executes any scripts within the network responsive resource and the rendering engine 383 renders the network responsive resource to form one or more rendered images. The virtual browser 384 then passes the rendered image to the local browser 324 at the client device 310. Thereafter, the virtual browser 384 waits for additional requests from the local browser 324 in connection with the virtual browser session.

Figure 4:
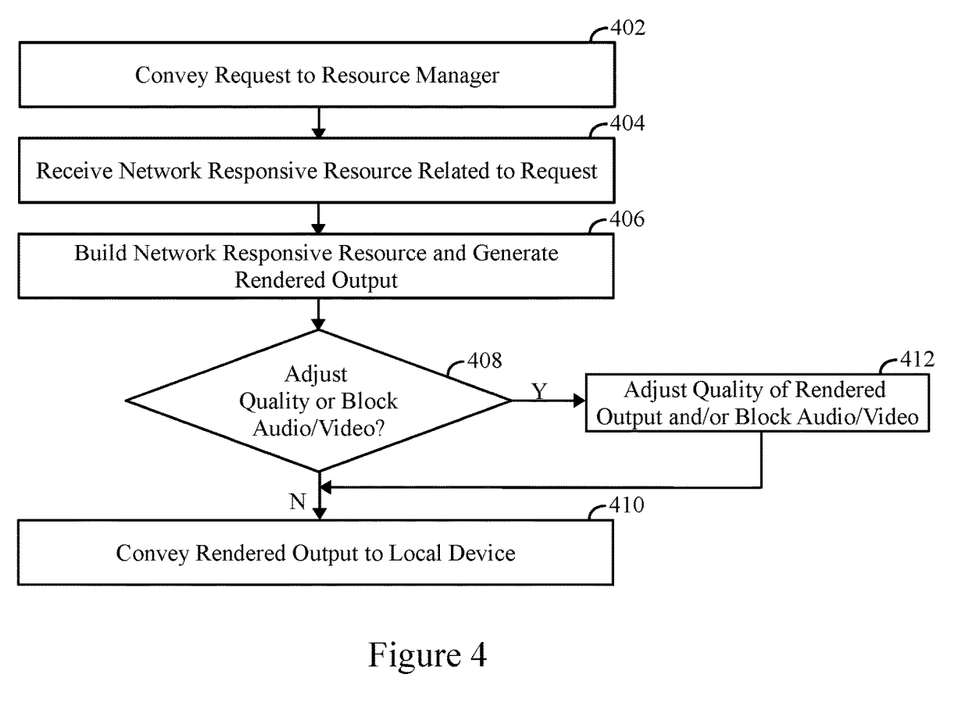
FIG. 4 illustrates a process implemented by a virtual browser in accordance with embodiments herein.

FIG. 4 illustrates a process implemented by a virtual browser in accordance with embodiments herein. The operations of FIG. 4 occurred after a virtual browser session has been formed. At 402, the virtual browser conveys a request, received from a local browser, to a resource manager. At 404, the virtual browser receives a network responsive resource related to the request. At 406, the virtual browser builds the network responsive resource and generates a rendered output. At 408, the virtual browser determines whether to implement a quality adjustment in connection with the rendered output. For example, the determination at 408 may be based in part on a connection between the local device and the remote device. For example, when the communications path between the local and remote devices is slow, has limited bandwidth or other deficiencies, the determination at 408 may determine to implement a quality adjustment. When the process determines to not adjust the quality, flow moves to 410. At 410, the rendered output is returned to the local device.

Alternatively, when a quality adjustment is determined at 408, flow moves to 412. At 412, the virtual browser adjusts a quality of the rendered output. For example, the quality may be adjusted by reducing the resolution, changing color depth, performing compression upon the rendered output, reducing a resolution of the rendered output and the like. Thereafter, flow moves to 410 where the reduced quality rendered output is returned to the local device.

Optionally, the quality adjustment by include buffering and reducing a quality of video and audio before passing the content to the client device. Optionally, the quality adjustment may include blocking audio and/or video and only passing corresponding text to the client device. For example, a news audio and/or video may be blocked at the virtual browser while related text is passed to the local browser. Optionally, the video and/or audio may be compressed and sent separate from the text content in order for the text content to be viewed more quickly.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "processor", "circuit," "module" or "system." Furthermore, aspects may take the form of a computer (device) program product embodied in one or more computer (device) readable storage medium(s) having computer (device) readable program code embodied thereon.

The memory and a data store may represent any combination of one or more non-signal computer (device) readable medium(s). The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

The instructions may represent program code for carrying out operations that may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. The applications herein may execute a set of instructions that are stored in one or more storage elements, in order to process data. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
utilizing one or more processors to perform the following:
initiating a local browser session between a local browser at a client device and a resource manager over a first route that is separate from a remote device;
measuring a responsiveness of the local browser session, the responsiveness including a first route responsiveness of the first route between the client device and the resource manager, the first route being separate from the remote device;
determining that the responsiveness of the local browser session falls below a threshold;
based on the determining, transferring the local browser session from the local browser to a virtual browser on the remote device to form a virtual browser session over a second route between the remote device and the resource manager, the remote device located remote from the client device;
implementing the virtual browser session by:
generating a request based on user interaction at the client device with the virtual browser session;
conveying the request from the client device through the remote device to the resource manager;
receiving, at the remote device, a network responsive resource provided by the resource manager in response to the request;
rendering, at the remote device, the network responsive resource to form the rendered output; and
displaying, at the client device, the rendered output.

2. The method of claim 1, wherein the measuring includes measuring, as the responsiveness, one or more of the load time, bandwidth, or amount of traffic over the first route.

3. The method of claim 1, wherein the determining includes comparing the responsiveness to historic responsiveness in connection with one or more prior browser sessions; wherein the threshold is based at least in part on the historic responsiveness.

4. The method of claim 1, further comprising implementing a baseline browser session at the client device and recording baseline responsiveness in connection with the baseline browser session;
wherein the determining includes comparing the responsiveness to the baseline responsiveness; and wherein the threshold is based at least in part on the baseline responsiveness.

5. The method of claim 1, further comprising receiving a normal load time in connection with initiating the local browser session, the normal load time being maintained in a collection of multiple normal load times recorded in connection with multiple prior browser sessions;
   wherein the determining includes comparing the responsiveness with the collection of multiple normal load times; and
   wherein the threshold is based at least in part on the normal load time.

6. The method of claim 1, further comprising, based on determining that the responsiveness of the local browser session falls below the threshold, comparing the first route responsiveness of the first route between the client device and the resource manager to a second route responsiveness of the second route between the remote device and the resource manager to determine if the value of first route responsiveness falls below the value of the second route responsiveness; and, based on the comparing, continuing to transfer the local browser session from the local browser to the virtual browser.

7. The method of claim 1, wherein the virtual browser takes over control of the local browser session, and acts as a proxy for the local browser, the virtual browser utilizing a session ID assigned to the local browser session in connection with the virtual browser session.

8. The method of claim 1, wherein the local browser session is assigned a first session ID, the method further comprising directing the virtual browser to initiate a new browser session having a second session ID, wherein the new browser session utilizes one or more requests used by the local browser to initiate the local browser session to form the virtual browser session.

9. The method of claim 1, further comprising:
   obtaining the first route responsiveness of the local browser session at the local browser on the client device during the remote session;
   obtaining a second route responsiveness of the virtual browser session at the virtual browser on the remote device over the second route during the remote session, the virtual browser session corresponding to the local browser session;
   transferring the local browser session between the local browser and the virtual browser based on the first and second route responsiveness of the local and virtual browser sessions during the remote session; and
   displaying, at the client device, a rendered output from one of the local or virtual browser sessions.

10. The method of claim 9, wherein transferring includes transferring the local browser session to the virtual browser when the second route responsiveness of the virtual browser session exceeds the first route responsiveness of the local browser session during the remote session.

11. The method of claim 9, wherein transferring includes transferring the virtual browser session to the local browser when the first route responsiveness of the local browser session exceeds the second route responsiveness of the virtual browser session during the remote session.

12. The method of claim 1, further comprising, based on the determining, comparing the first route responsiveness of the first route between the client device and the resource manager to a second route responsiveness of the second route between the remote device and the resource manager to determine if the value of first route responsiveness exceeds the value of the second route responsiveness; and, based on the comparing, ceasing to transfer the local browser session from the local browser to the virtual browser.

13. A client device, comprising:
   a user interface and a display;
   memory storing instructions;
   one or more processors to execute the instructions to perform the following:
   initiate a local browser session between a local browser at a client device and a resource manager over a first route that is separate from a remote device;
   measure a responsiveness of the local browser session, the responsiveness including a first route responsiveness of the first route between the client device and the resource manager, the first route being separate from the remote device;
   determine that the responsiveness of the local browser session falls below a threshold;
   based on the determine, transfer the local browser session to a virtual browser on the remote device to form a virtual browser session between the remote device and the resource manager over a second route, the remote device located remote from the client device;
   generate a request based on user interaction at the user interface with the virtual browser session;
   convey the request from the client device through the remote device to the resource manager;
   receive, at the client device, a rendered output that was rendered, at the remote device, based on a network responsive resource provided from the resource manager to the remote device in response to the request; and
   display the rendered output.

14. The device of claim 13, wherein the one or more processors measure, as the responsiveness, one or more of the load time, bandwidth, or amount of traffic over the first route.

15. The device of claim 13, wherein the one or more processors, as part of the determine, compare the responsiveness to historic responsiveness in connection with one or more prior browser sessions; wherein the threshold is based at least in part on the historic responsiveness.

16. The device of claim 13, wherein the one or more processors implement a baseline browser session at the client device and record baseline responsiveness in connection with the baseline browser session; and wherein the one or more processors, as part of the determine, compare the responsiveness to the baseline responsiveness; wherein the threshold is based at least in part on the baseline responsiveness.

17. The device of claim 13, wherein the one or more processors receive a normal load time in connection with initiating the local browser session, the normal load time being maintained in a collection of multiple normal load times recorded in connection with multiple prior browser sessions; and wherein the one or more processors, as part of the determine, compare the responsiveness with the collection of multiple normal load times; wherein the threshold is based at least in part on the normal load time.

18. The device of claim 13, wherein the one or more processors, based on determining that the responsiveness of the local browser session falls below the threshold, compare the first route responsiveness of the first route between the client device and the resource manager to a second route responsiveness of a second route between the remote device and the resource manager to determine if the value of first route responsiveness falls below the value of the second route responsiveness, and, based on the compare, continue to transfer the local browser session from the local browser to the virtual browser.

\* \* \* \* \*